Figure 4:
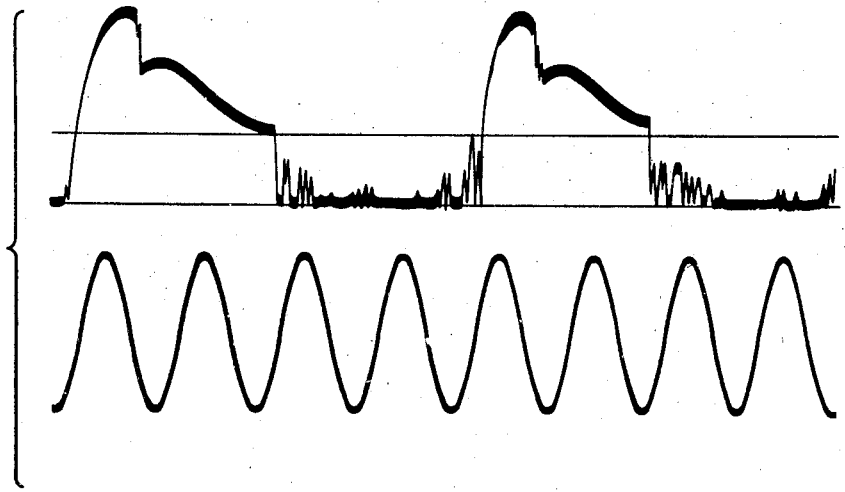

Dec. 21, 1948.  F. W. MERRILL  2,456,979
SPEED GOVERNOR
Filed Jan. 19, 1945  2 Sheets-Sheet 1
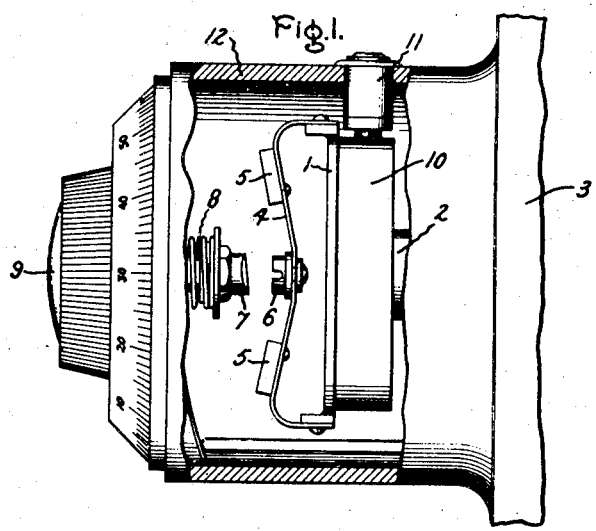
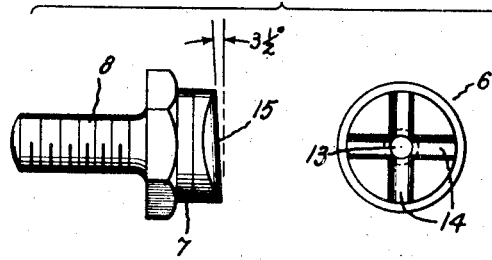
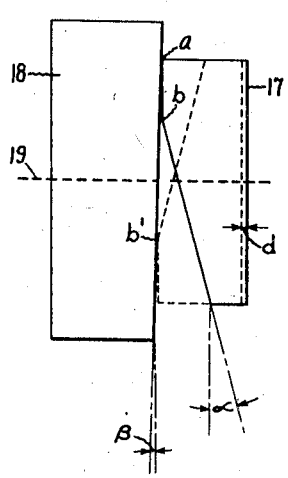
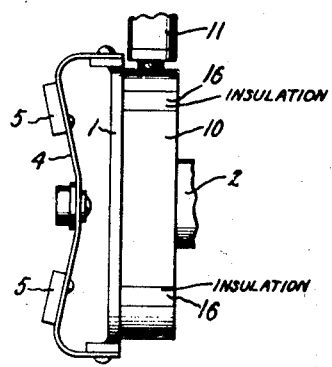
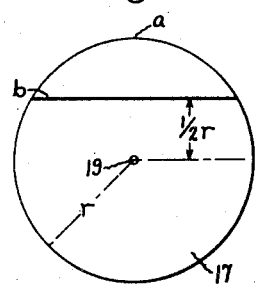
Inventor:
Frank W. Merrill,
by Harry E. Dunham
His Attorney.

Dec. 21, 1948.    F. W. MERRILL    2,456,979
SPEED GOVERNOR

Filed Jan. 19, 1945    2 Sheets-Sheet 2

Inventor:
Frank W. Merrill,
by Harry E. Dunham
His Attorney.

Patented Dec. 21, 1948

2,456,979

UNITED STATES PATENT OFFICE 2,456,979

SPEED GOVERNOR

Frank W. Merrill, Fort Wayne, Ind., assignor to General Electric Company, a corporation of New York Application January 19, 1945, Serial No. 573,552

4 Claims. (Cl. 200—80)

1

This invention relates to speed governors and more particularly to improvements in centrifugally operated speed governors of the center contact type.

This is a continuation-in-part of my application Serial No. 511,979, filed November 27, 1943 now abandoned and assigned to the assignee of this application.

By "center contact" governor is meant a governor having a rotatable member carrying a contact which is mounted concentrically with respect to its axis of rotation and which is actuated by means of centrifugal weights so as to move in an axial direction. This so-called center contact cooperates with a fixed contact for opening and closing a speed control circuit. The position of the fixed contact is usually adjustable in the axial direction so as to provide adjustment of the speed setting of the governor. Thus, depending upon the position of this fixed contact, the amount of centrifugal force and hence speed required to move the center contact against the opposing action of a spring will be varied. The governor may be embodied in a number of forms, some of which are shown in Tiffany Patents Nos. 1,136,739 and 1,303,417, Ulmer Patent No. 1,795,240 and Sole Patent No. 1,860,556. All of those governors are characterized by the use of a transversely flat blade spring which carries the center contact and which also carries one or more actuating weights which serve to bend the spring under the influence of centrifugal force. This spring is usually made of steel and it may either be normally straight as in the Tiffany patents or normally curved, the curve being either concave inwardly as in the Ulmer patent or convex outwardly as in the Sole patent.

The most common use of such a governor is as an automatic speed governor for an electric motor in which case the contacts are connected, either directly, or indirectly through an amplifier, in either the motor armature circuit or the motor field circuit. It serves to compensate for variations in motor load, motor supply voltage and motor temperature. All of these variations normally tend to vary the speed of a motor, the temperature variation causing variation in resistance of the motor windings which in turn varies the current in them and hence the speed. For ordinary variations in these quantities of a few per cent the regulator operates very satisfactorily to maintain constant speed. However, over a great voltage range, such as a range of 2 or more to 1, combined with load changes, or over a very wide adjustable speed range such as 4 to 1, typically 8,000 R. P. M. to 2,000 R. P. M. combined with load changes on the motor it has been found that the governor becomes unstable and what may be termed rough in operation. In order that the governor be able to maintain constant speed under such wide variations in operating conditions it is necessary that its contacts be able to control a relatively large amount of power, either directly or by means of a suitable amplifier. In either case the power impulses established by the opening and closing of the regulator contacts are so great that any deviation from their normal steady vibratory beat will cause great surges in the value of the input current to the motor. With a direct current motor these surges act like a superposition of alternating current on the otherwise direct current input and cause abnormal losses and poor commutation.

I have found that this undesirable operation can be eliminated by providing means for positively breaking the circuit through the contacts at least once every revolution of the regulator.

An object of the invention is to provide a new and improved speed governor.

Another object of the invention is to provide novel stabilizing means for centrifugal speed governors of the center contact type.

The invention will be better understood from the following description taken in connection with the accompanying drawings and its scope will be pointed out in the appended claims.

Figure 5:
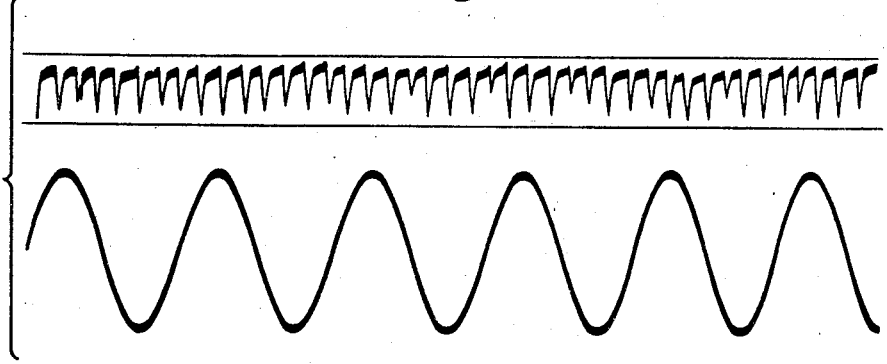

In the drawings Fig. 1 shows a regulator provided with improved contacts constructed in accordance with a preferred embodiment of my invention, Fig. 2 is a detailed enlarged view of these contacts, Fig. 3 shows a modified form of the invention, Fig. 4 is an oscillogram showing the unstable operation of a conventional center contact regulator, Fig. 5 is an oscillogram showing the improvement produced by my invention, Fig. 6 shows a modified, and at present preferred, form of contacts, and Fig. 7 is another view of one of the contacts shown in Fig. 6.

Referring now to the drawings and more particularly to Fig. 1, the regulator comprises a rotatable member 1 which may be made of any suitable material and which is adapted to be mounted on the end of a shaft 2, such as the shaft of an electric motor, a part of the housing of which is shown at 3. Mounted on the rotatable member is a transversely flat longitudinally curved spring 4 which is preferably made of suitable spring steel. The ends of this spring are fastened by any suitable means, such as rivets, to the periphery of the rotatable member in such a way that the spring extends across the axis of rotation of the rotatable member. As shown, the spring is curved so as to be concave inwardly as viewed from left to right in the drawings. Fastened to this spring 4 by any suitable means, such as rivets, are actuating weights 5 which are located near the ends of the spring and on opposite sides of its center. Carried at the center of the spring and mounted concentrically with respect to its axis of rotation is a center contact 6 which cooperates with a normally fixed but axially adjustable contact 7 carried on the end of a threaded screw 8 which is turned by means of a knurled knob 9. Electrical connections are made to the center contact through the spring 4 by means of a collector ring 10 on the rotatable member and a brush assembly 11 carried by a housing 12.

As shown more in detail in Fig. 2, the centrifugally actuated contact 6 is provided with a central opening 13 and with crossed slots 14, while the post contact 7 is provided with an arcuate taper 15. The spring carried contact 6 is normally positive in polarity with respect to the post contact 7 and is preferably made of a hard platinum alloy which is tough but not brittle. In one embodiment of the invention which has operated very successfully its diameter is $\tfrac{7}{16}''$, the diameter of the center opening being .040" and the two crossed slots are .036" wide. The post contact 7 is normally negative in polarity and is made of very hard, long-wearing material, such as tungsten-carbide. In a very successful embodiment of the invention it is $\tfrac{3}{32}''$ in diameter and the taper is 3½°. In addition, the contact surface is ground arcuate in shape to a radius of .625" but this is not essential.

In operation the tapered construction of the post contact and the slotted construction of the positive contact combine to produce four contact bounces per revolution of the rotatable contact and these bounces serve to stabilize the action of the governor by preventing contact flutter and wide surges in power controlled by the governor contact. I have found that it is not essential to have four breaks per revolution and one slot alone can be employed or only one-half a slot, that is to say, only one irregularity on the rotating contacts so as to produce only one break per revolution. Similarly, it is not essential that the tapered post contact be arcuate in shape and a plane surface tapered contact will also provide very good results.

It has also been found that stability can be secured by electrically opening the circuit to the contacts one or more times a revolution without actually producing a mechanical bounce of the contacts. One arrangement for doing this is shown in Fig. 3 where the collector ring is provided with a plurality of insulating spots 16 which when they pass under the brush 11 break the circuit through the contacts.

In Fig. 4 there is shown an oscillogram of the voltage across the governor contacts when the negative post contact is smooth and flat and is not provided with any taper and the positive contact is smooth and flat and has no irregularities. This is compared with a 60-cycle timing wave and it will be seen that there are violent surges in contact voltage which occur in a regular cycle.

A very pronounced improvement which is produced by the present invention is shown in Fig. 5 in which an oscillogram of the voltage across the contacts is compared with a 60-cycle timing wave. This oscillogram was made across contacts, the negative one of which has a 3½° taper and an arc of .625" and the positive contacts are cross slotted, as shown in Fig. 2. This figure clearly shows how the rapid bouncing action of the contacts reduces the magnitude of the voltage surges across the contacts.

Another form of contact construction which has a materially longer life and a more pronounced contact bounce is shown in Fig. 6. These contacts produce what may be termed a "once around bounce" and they are what I at present consider the most preferred contact construction. Contact 17 is the positive contact and contact 18 is the negative contact. The positive contact 17 is preferably made of an oxidation resistant material, such as platinum or one of its alloys, a preferred material being a platinum osmium alloy known as Baker 880. The negative contact is made of a less expensive material but which is very hard and wear resistant. Suitable materials are tungsten or tungsten carbide held together by a binder. The contacts are preferably both cylindrical in shape and have a common axis 19. They are shown in side elevation in Fig. 6. It is immaterial which of the two is the rotating contact and which is the stationary contact.

Contact 17 has the major portion of its face cut away or beveled at a fairly large angle $\alpha$, such as 15°, with the perpendicular to the axis 19 so as to form an eccentric contact face or surface which is perpendicular to the axis 19. A plan view of the contact 17 is shown in Fig. 7 and it will be seen that the contact face is in the form of a segment of a circle, the chord $b$ being the intersection of the two planes formed by the eccentric contact face and the beveled face respectively.

The contact 18 has its contact face inclined at a small angle $\beta$ with the perpendicular to the axis 19, this angle being typically 1°.

The operation of the "once around bounce" contacts shown in Figs. 6 and 7 is as follows: Assume that contact 17 is rotating and that contact 18 is fixed. As contact 17 rotates it is also vibrating axially and this rate of vibration is usually at a much higher frequency per second than the revolutions per second of the motor. In the position shown in solid lines in Fig. 6, point $a$ is making contact with negative contact 18, but 180° later the contact 17 is in the position shown by the dashed lines so that contact is now made at $b'$. The axial movement of the contact 17 when it goes between its full line and dashed line positions is the distance $d$ which equals 1½ $r$ times the tangent of angle $\beta$ when the chord $b$ in Fig. 7 is located ½ $r$ from the axis, where $r$ is the radius of the contact 17. As will be explained later, ½ $r$ is a preferred initial position for the chord $b$.

As time goes on, the substance of contact 17 is electrically transferred to the surface of contact 18. The rapid rotation brushes this off allowing only the formation of a thin film of platinum alloy on the hard negative surface of the contact 18. This electrical erosion is concentrated on the contact segment only of contact 17. Its effect is to increase the segment area and move the chord $b$ slowly toward the center of the contact 17. When chord $b$ has reached the center, the bounce will have become reduced to $r$ times tangent $\beta$. As wear proceeds further the bounce becomes less and less.

It is estimated that with a $\tfrac{7}{16}''$ diameter contact 17, the chord $b$ will become a diameter after about 8,000 hours of normal operation. Continued operation, while perfectly possible, is not expected to be as satisfactory after the chord passes the axis and therefore the contact 17 may either be replaced or it may be renewed by grinding the angle α surface lower so as to push the line or chord b back to a distance of approximately ½ r from the center or axis. This distance ½ r is not critical. It can be as great as ⅔ r but should not be less than ½ r. The angle α is also not very critical and it can also vary forward to 20 or more degrees.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. An electric motor speed regulator of the centrifugally actuated center contact type comprising a fixed center contact having a tapered contact surface, and axially vibratory rotating contact having at least one slot formed therein, centrifugal means for opening and closing said contacts responsive to the speed of said motor, said contacts co-acting to interrupt the electric circuit through the regulator contacts at least once for each revolution of said regulator in addition to the opening and closing of said contacts responsive to the said centrifugal means.

2. An electric motor speed regulator of the centrifugally actuated center contact type comprising a fixed contact, an axially vibratory rotating contact, centrifugal means responsive to the speed of said motor for opening and closing said contacts, one of said contacts having a tapered surface and the other having at least one slot formed therein whereby said contacts are mechanically separated at least once each revolution of said regulator in addition to the opening and closing of said contacts responsive to said centrifugal means.

3. A centrifugally actuated center contact type speed governor comprising a fixed contact and an axially vibratory rotating contact, centrifugal means responsive to the speed of said rotation for opening and closing said contacts, one of said contacts having a tapered contact surface and the other having a surface adapted to provide contact separating bounces as one contact rotates relative to the other whereby the opening of said contacts is insured at least once for each revolution of said regulator in addition to the opening responsive to said centrifugal means.

4. An electric motor speed regulator of the centrifugally actuated center contact type comprising a fixed center contact, an axially vibratory rotating contact, centrifugal means for opening and closing said contacts responsive to the speed of said motor, one of said contacts having a flat contact surface making an unvarying small angle with the perpendicular to the axis of said axially vibratory contact, the other of said contacts having a flat contact surface perpendicular to said axis, said contact surface of said other contact being eccentric to said axis and being formed by cutting away more than half of the surface of said other contact at an angle with the perpendicular to said axis which is substantially greater than the angle which the face of said one contact makes with the perpendicular to said axis, said contacts co-acting on relative rotation to interrupt the electric circuit through said contacts at least once for each revolution of said regulator in addition to the opening and closing of said contacts responsive to said centrifugal means.

FRANK W. MERRILL.

REFERENCES CITED

The following references are of record in the file of this patent:

UNITED STATES PATENTS

| Number | Name | Date |
| --- | --- | --- |
| 1,048,670 | Fessenden | Dec. 31, 1912 |
| 1,578,794 | Banneitz | Mar. 30, 1926 |
| 1,653,823 | Pudelko | Dec. 27, 1927 |
| 2,103,589 | Lee | Dec. 28, 1939 |
| 2,160,659 | Hansel | May 30, 1939 |
| 2,182,977 | Werner | Dec. 12, 1939 |
| 2,144,733 | Jepson | Jan. 24, 1939 |
| 2,400,003 | Hensel | May 7, 1946 |

FOREIGN PATENTS

| Number | Country | Date |
| --- | --- | --- |
| 316,038 | Germany | Nov. 18, 1919 |
| 497,472 | Germany | May 8, 1930 |
| 519,107 | Germany | Feb. 24, 1931 |